(12) United States Patent
Zhu

(10) Patent No.: US 11,460,937 B2
(45) Date of Patent: Oct. 4, 2022

(54) DISPLAY PANEL AND DISPLAY DEVICE

(71) Applicant: BEIJING SMART-AERO DISPLAY TECHNOLOGY CO., LTD., Beijing (CN)

(72) Inventor: Huizhong Zhu, Beijing (CN)

(73) Assignee: BEIJING SMART-AERO DISPLAY TECHNOLOGY CO., LTD., Beijing (CN)

( * ) Notice: Subject to any disclaimer, the term of this patent is extended or adjusted under 35 U.S.C. 154(b) by 53 days.

(21) Appl. No.: 16/488,922

(22) PCT Filed: Feb. 2, 2019

(86) PCT No.: PCT/CN2019/074635
§ 371 (c)(1),
(2) Date: Sep. 1, 2021

(87) PCT Pub. No.: WO2020/007047
PCT Pub. Date: Jan. 9, 2020

(65) Prior Publication Data
US 2022/0011894 A1    Jan. 13, 2022

(30) Foreign Application Priority Data
Jul. 6, 2018 (CN) .......................... 201821068907.1

(51) Int. Cl.
*G06F 3/041*  (2006.01)
*G06F 3/044*  (2006.01)

(52) U.S. Cl.
CPC .......... *G06F 3/0412* (2013.01); *G06F 3/0446* (2019.05); *G06F 2203/04111* (2013.01)

(58) Field of Classification Search
CPC ................. G06F 3/0412; G06F 3/0446; G06F 2203/04111; G06F 3/0443; G06F 2203/04103; G06F 2203/04107; G06F 3/0418
See application file for complete search history.

(56) References Cited

U.S. PATENT DOCUMENTS

| | | | | |
|---|---|---|---|---|
| 2013/0015868 A1* | 1/2013 | Peng | ..................... | G06F 3/0446 324/688 |
| 2014/0106684 A1* | 4/2014 | Burns | ..................... | H01Q 21/28 29/601 |
| 2014/0118299 A1* | 5/2014 | Wang | ................... | G09G 3/3648 345/174 |
| 2014/0267128 A1* | 9/2014 | Bulea | ..................... | G06F 3/0445 345/174 |

FOREIGN PATENT DOCUMENTS

| | | |
|---|---|---|
| CN | 202735635 U | 2/2013 |
| CN | 103926727 A | 7/2014 |
| CN | 104216564 A | 12/2014 |
| CN | 208721156 I | 12/2018 |

* cited by examiner

*Primary Examiner* — Md Saiful A Siddiqui
(74) *Attorney, Agent, or Firm* — Kinney & Lange, P.A.

(57) ABSTRACT

A display panel and a display device are provided in embodiments of the disclosure, including: a first substrate, on a display side of the display panel; and a second substrate opposite to the first substrate; and a first transparent conductive pattern is provided on a side surface of the first substrate facing towards the second substrate, and is arranged to be electrically connected to a ground point.

19 Claims, 4 Drawing Sheets

--Prior Art--

# DISPLAY PANEL AND DISPLAY DEVICE

CROSS-REFERENCE TO RELATED APPLICATION

This application is a Section 371 National Stage Application of International Application No. PCT/CN2019/074635, filed on Feb. 2, 2019, entitled "DISPLAY PANEL AND DISPLAY DEVICE", which has not been published yet, which claims priority to Chinese Patent Application Invention No. 201821068907.1 filed on Jul. 6, 2018 in the China National Intellectual Property Administration, the whole disclosure of which is incorporated herein by reference.

BACKGROUND OF THE DISCLOSURE

Field of the Disclosure

Embodiments of the present disclosure generally relate to the technical field of display technology, and in particular, to a display panel and a display device.

Description of the Related Art

In technical fields such as industrial control and aviation and the like, relatively strict requirements are proposed directing to electromagnetic shielding; and in order to fulfill corresponding standards in this connection, in a relevant art, a solution lies in that an external side of a display screen is fully bonded with and thus completely covered by a shielding film layer, so as to shield any influence applied by electrical signals inside the screen onto outer environment. In the solution in the relevant art, by way of example, typically an optical adhesive is used to bond a body of a display panel, the shielding film layer which is additionally provided, and a touch module tightly with one another.

SUMMARY OF THE DISCLOSURE

The embodiments of the present disclosure have been made to overcome or alleviate at least one aspect of the above mentioned disadvantages and/or shortcomings in the prior art, by providing a display panel and a display device.

Following technical solutions are adopted in exemplary embodiments of the disclosure.

According to one aspect of embodiments of the disclosure, there is provided a display panel, comprising: a first substrate, on a display side of the display panel; and a second substrate opposite to the first substrate; and a first transparent conductive pattern is provided on a side surface of the first substrate facing towards the second substrate, and is arranged to be electrically connected to a ground point; an orthogonal projection of the first transparent conductive pattern on the second substrate at least partially covers a display region of the second substrate, a second transparent conductive pattern is provided on a side surface of the second substrate facing towards the first substrate, and is arranged to be electrically connected to the ground point; and a plurality of first electrodes functioning as a plurality of first touch electrodes are provided on a side of the first substrate facing towards the second substrate, and a plurality of second electrodes functioning as a plurality of second touch electrodes are provided on a side of the second substrate facing towards the first substrate.

According to embodiments of the disclosure, a combination of the orthogonal projection of the first transparent conductive pattern on the second substrate and an orthogonal projection of the second transparent conductive pattern on the second substrate completely covers the display region of the second substrate.

According to embodiments of the disclosure, the orthogonal projection of the first transparent conductive pattern on the second substrate and the orthogonal projection of the second transparent conductive pattern on the second substrate are arranged to be staggered with each other.

According to embodiments of the disclosure, the orthogonal projection of the first transparent conductive pattern on the second substrate and the orthogonal projection of the second transparent conductive pattern on the second substrate do not overlap with each other at all.

According to embodiments of the disclosure, the orthogonal projection of the first transparent conductive pattern on the second substrate and the orthogonal projection of the second transparent conductive pattern on the second substrate at least partially overlap with each other.

According to embodiments of the disclosure, the first transparent conductive pattern and the plurality of first electrodes are provided in one and the same layer and are electrically isolated from each other, and the first transparent conductive pattern are located at gaps among adjacent ones of the plurality of first electrodes.

According to embodiments of the disclosure, the first transparent conductive pattern fills the gaps among adjacent ones of the plurality of first electrodes.

According to embodiments of the disclosure, the second transparent conductive pattern and the plurality of second electrodes are provided in one and the same layer and are electrically isolated from each other, and the second transparent conductive pattern are located at gaps among adjacent ones of the plurality of second electrodes.

According to embodiments of the disclosure, the second transparent conductive pattern fills the gaps among adjacent ones of the plurality of second electrodes.

According to embodiments of the disclosure, the plurality of first electrodes are multiplexed as a plurality of first display electrodes in a time division manner, and the plurality of second electrodes are multiplexed as a plurality of second display electrodes in a time division manner; and an operation time period of the display panel comprises: a touch time period, in which the plurality of first electrodes are switched to operate as the plurality of first touch electrodes and the plurality of second electrodes are switched to operate as the plurality of second touch electrodes; and a display time period, in which the plurality of first electrodes are switched to operate as the plurality of first display electrodes and the plurality of second electrodes are switched to operate as the plurality of second display electrodes.

According to embodiments of the disclosure, in a condition that during the display time period, the plurality of first electrodes are switched to operate as the plurality of first display electrodes and the plurality of second electrodes are switched to operate as the plurality of second display electrodes, the plurality of first display electrodes belong to one type of a common electrode and pixel electrodes, and the plurality of second display electrodes belong to the other type of the common electrode and the pixel electrodes.

According to embodiments of the disclosure, in response to the display panel which is a transmissive display panel, the display side of the display panel is a light-emergent side for inner light rays; and in response to the display panel which is a reflective display panel, the display side of the display panel is a light-incident side for external light rays.

According to embodiments of the disclosure, the orthogonal projection of the first transparent conductive pattern on the second substrate comprises a plurality of first section blocks arranged in a form of a first array, and the orthogonal projection of the second transparent conductive pattern on the second substrate comprises a plurality of second section blocks arranged in a form of a second array which is complementary to the first array or at least partially overlaps with the first array, and the plurality of first section blocks and the plurality of second blocks are arranged alternately in every row and in every column.

According to embodiments of the disclosure, in a condition that during the touch time period, the plurality of first electrodes are switched to operate as the plurality of first touch electrodes and the plurality of second electrodes are switched to operate as the plurality of second touch electrodes, the plurality of first touch electrodes belong to one type of driving electrodes and sensing electrodes, and the plurality of second touch electrodes belong to the other type of the driving electrodes and the sensing electrodes.

According to another aspect of the exemplary embodiment of the present disclosure, there is provided display device, comprising the display panel as above.

According to embodiments of the disclosure, the display device is an aviation display screen or a display screen for industrial-control equipment.

According to embodiments of the disclosure, the display device further comprises a housing configured to accommodate the display panel.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which:

FIG. 1 illustrates a schematic view of a display in a relevant field such as industrial control and aviation and the like;

DETAILED DESCRIPTION OF EMBODIMENTS

Figure 1:

Technical solutions of the disclosure will further be described in detail below in embodiments thereof, with reference to the accompanying drawings. In the specification and the drawings, the same or similar reference numerals are used to refer to the same or similar components or members. It is to be understood that the following description of the embodiments with reference to the accompanying drawings is intended to be illustrative of general concept of the disclosure, rather than a limitation of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a display panel and a display device.

According to a general concept of embodiments of the disclosure, in an aspect of the embodiments, in order to make clearer both technical problems to be solved by the embodiments of the present disclosure, and specific technical schemes and advantages thereof, a detail description will be set forth as below in conjunction with the accompanying drawings and specific embodiments.

As illustrated in FIG. 1, a display used in technical fields such as industrial control and aviation and the like may typically for example comprise a display panel body 1 and a touch screen 4; and in order to shield undesired electromagnetic effects applied by internal electrical signals inside the display panel body 1, typically onto touch electrodes (e.g., in the touch screen 4) located outside the display panel body 1, then the display may for example additionally comprise a shielding film 3 which is fully laminated so as to be completely bonded in an air-tight manner onto an external side of the display panel body 1 by an adhesive for full lamination (e.g., an optical adhesive) 2, then the shielding film 3 is for example attached onto a side of the display panel body 1 facing towards the touch screen 4 via the adhesive 2, for example as illustrated, such that both the shielding film 3 and the adhesive 2 are interposed between the display panel body 1 and the touch screen 4. And the shielding film 3 is configured to provide an electromagnetic shielding functionality directing to the electromagnetic effects resulting from the electrical signals inside the display panel body 1. However, in such a solution, e.g., the adhesive for full lamination may easily be subject to accelerated aging in a condition of both a relatively high temperature and a relatively high humidity, resulting in that the shielding film 3 may for example be at least partially peeled off from the display panel body 1 and in turn the shielding functionality may fail in service, and both the thickness and the weight of the display may be increased simultaneously as compared with a display having no such shielding film.

Based on this technical solution as illustrated, in embodiments of the disclosure, a display panel and a display device may further be provided, which may intend to enhance reliability of the display device and decrease an overall weight of the display device while improving electromagnetic compatibility thereof.

Figure 2:
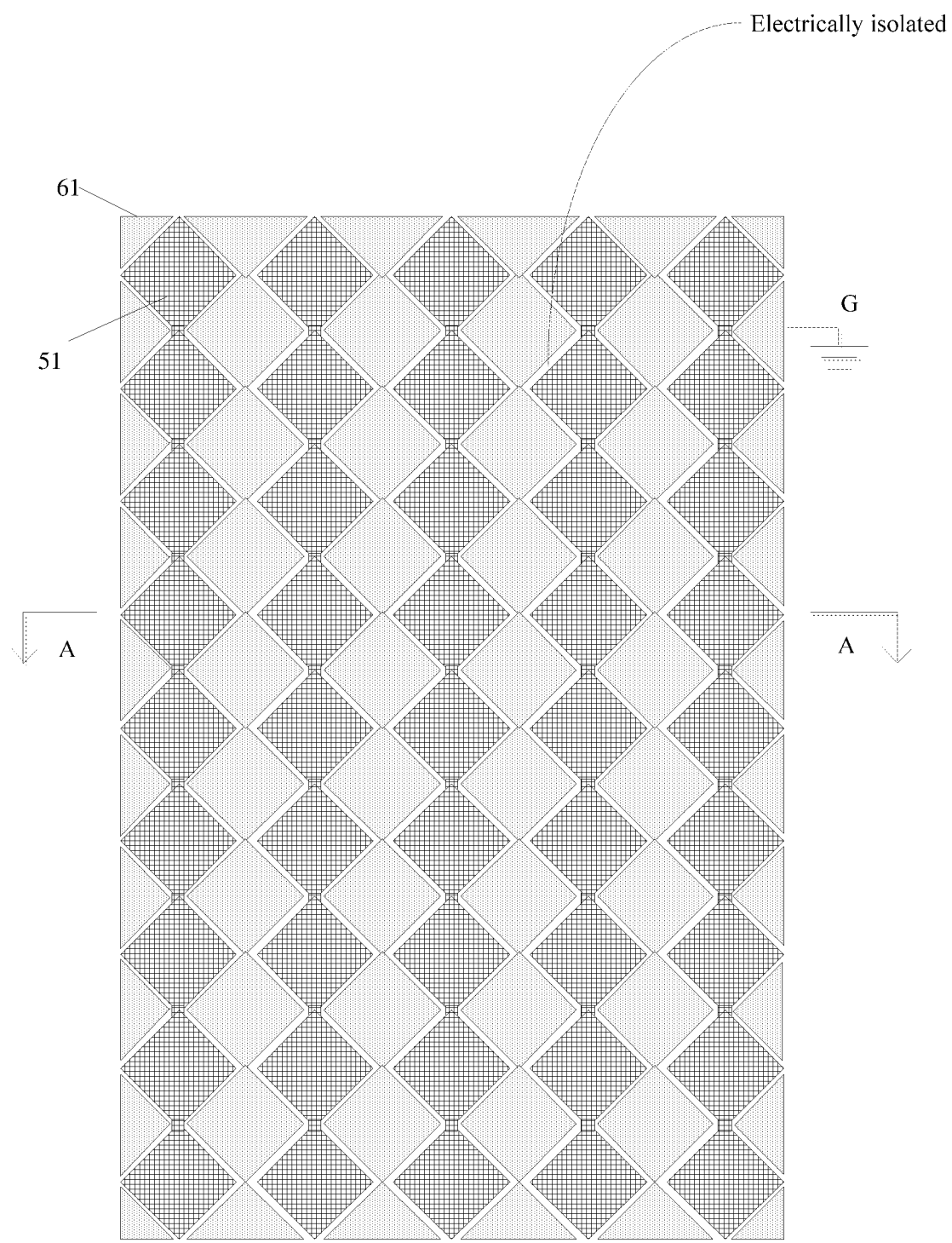
FIG. 2 illustrates a schematic planar view of a first substrate according to exemplary embodiments of the disclosure.
Figure 3:
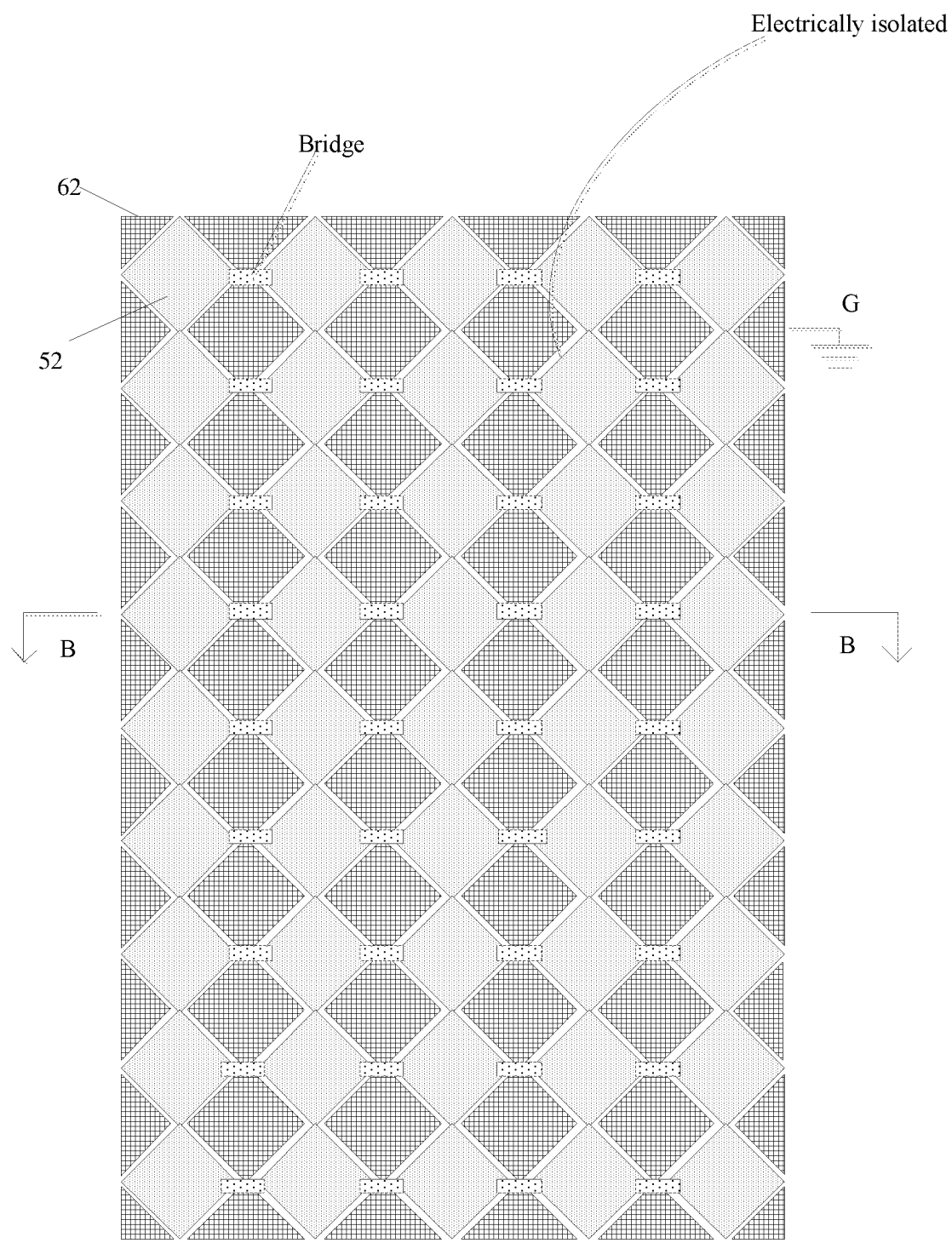
FIG. 3 illustrates a schematic planar view of a second substrate according to exemplary embodiments of the disclosure.
Figure 4:
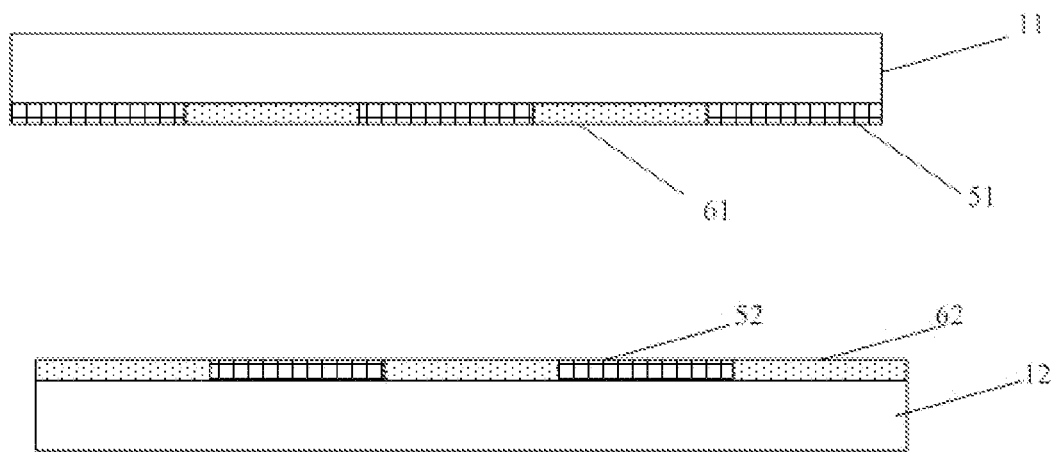
FIG. 4 illustrates at an upper view thereof a schematic sectional view of the first substrate as illustrated in FIG. 2, along a sectional line A-A therein, and illustrates at a lower view thereof a schematic sectional view of the first substrate as illustrated in FIG. 3, along a sectional line B-B therein.

According to a general concept of embodiments of the disclosure, a display panel 1 is provided, for example as illustrated in FIG. 2, FIG. 3 and FIG. 4, comprising a first substrate 11 which is for example located on a display side of the display panel 1 (e.g., an upper side as illustrated; the display side is a light-emergent side thereof for inner light rays in a condition that the display panel is a transmissive display panel, or the display side is a light-incident side thereof for external light rays in a condition that the display panel is a reflective display panel); and a second substrate 12 provided opposite to the first substrate 11 (i.e., the second substrate is provided on a back side of the display panel 1 opposite to the display side thereof). A first transparent conductive pattern 61 is additionally provided on a side surface of the first substrate 11 facing towards the second substrate 12, and is arranged to be electrically connected to a ground point; an orthogonal projection of the first transparent conductive pattern on the second substrate at least partially covers a display region of the second substrate, a second transparent conductive pattern is provided on a side surface of the second substrate facing towards the first substrate, and is arranged to be electrically connected to the ground point; and a plurality of first electrodes functioning as a plurality of first touch electrodes are provided on a side of the first substrate facing towards the second substrate, and a plurality of second electrodes functioning as a plurality of second touch electrodes are provided on a side of the second substrate facing towards the first substrate. In other words, the first transparent conductive pattern 61 is sandwiched or interposed between the first substrate 11 and the second substrate 112, for example in an air-tight manner.

In the embodiments, a side surface of the first substrate 11 of the display panel 1 facing towards the second substrate 12 is for example at least partially covered by the first transparent conductive pattern 61 additionally provided, such that an orthogonal projection of the first transparent conductive pattern on the second substrate 12 (which is provided opposite to the first substrate 11) may also at least partially cover a display region of the second substrate. The first transparent conductive pattern 61 is for example arranged to be electrically connected to the ground point G, such that internal electrical signals inside the display panel 1 may thus be shielded; and since the first transparent conductive pattern is provided within the display panel, then, it is merely required to form the first transparent conductive pattern 61 directly on the first substrate 11, or to form the first transparent conductive pattern 61 by interposing it between the first substrate 11 and the second substrate 12, without bonding the transparent conductive pattern and the display panel together by using the adhesive for full lamination, so as to enhance reliability of the display panel and decrease the overall weight of the display panel while improving electromagnetic compatibility of the display panel. The expression "to form the first conductive pattern 61 directly on the first substrate 11" as above is for example implemented by directly depositing a transparent conductive material such as Indium tin oxide (abbreviated as ITO), or other transparent conductive oxide (abbreviated as TCO) film material which is doped (such as aluminum-doped zinc oxide (i.e., AZO), fluorine-doped tin oxide (i.e., FTO), antimony-doped tin oxide (i.e., ATO) and the like) onto the first substrate 11, for example by evaporation, sputtering or the like, to function as a transparent conductive film layer.

Furthermore, a side surface of the second substrate 12 facing towards the first substrate 11 is for example at least partially covered by a second transparent conductive pattern 62 additionally provided, and the second transparent conductive pattern 62 is for example arranged to be electrically connected to the ground point, and thus may shield internal electrical signals inside the display panel body 1 so as to further enhance shielding effects for the internal electrical signals inside the display panel 1. The second transparent conductive pattern 62 formed on the second substrate 12 is for example prepared with a transparent conductive material such as Indium tin oxide (abbreviated as ITO), or other transparent conductive oxide (abbreviated as TCO) film material which is doped (such as aluminum-doped zinc oxide (i.e., AZO), fluorine-doped tin oxide (i.e., FTO), antimony-doped tin oxide (i.e., ATO) and the like) on the second substrate 12. The specific material of the second transparent conductive pattern 62 is for example selected to be the same as or different from the material of the first transparent conductive pattern 61, without being limited otherwise herein.

By way of example, a combination of the orthogonal projection of the first transparent conductive pattern 61 on the second substrate 12 and an orthogonal projection of the second transparent conductive pattern 62 on the second substrate 12 completely covers/occupies the display region of the second substrate. As illustrated, the first transparent conductive pattern 61 and the second transparent conductive pattern 62 are arranged that orthogonal projections thereof on the second substrate 12 are distributed alternately on the second substrate 12 so as to ensure that the combination of the orthogonal projection of the first transparent conductive pattern 61 on the second substrate 12 and the orthogonal projection of the second transparent conductive pattern 62 on the second substrate 12 completely covers the display region of the second substrate 12. By way of example, specifically, as illustrated in FIG. 2 and FIG. 3, the orthogonal projection of the first transparent conductive pattern 61 on the second substrate 12 comprises a plurality of first section blocks arranged in a form of a first array, and the orthogonal projection of the second transparent conductive pattern 62 on the second substrate 12 comprises a plurality of second section blocks arranged in a form of a second array which is complementary to the first array or at least partially overlaps with the first array, as illustrated in FIG. 2 and FIG. 3, such that the plurality of first section blocks of the orthogonal projection of the first transparent conductive pattern 61 on the second substrate 12 and the plurality of second blocks of the orthogonal projection of the second transparent conductive pattern 62 on the second substrate 12 are arranged alternately in every row and in every column. More specifically, as illustrated, each one of the plurality of first section blocks is in a form of a diamond shape or a square shape; each one of the plurality of second section blocks is in a form of a diamond shape or a square shape. By way of example, as illustrated in FIG. 4, the orthogonal projection of the first transparent conductive pattern 61 one the second substrate 12 and the orthogonal projection of the second transparent conductive pattern 62 on the second substrate are for example at least partially staggered relative to each other, e.g., as illustrated in FIG. 2 and FIG. 3, they are at least partially staggered relative to each other in every row and in every column. More specifically, the orthogonal projection of the first transparent conductive pattern 61 on the second substrate 12 and the orthogonal projection of the second transparent conductive pattern 62 on the second substrate 12 for example do not overlap with each other at all, e.g., they are completely complementary to each other in shape (i.e., in respective occupying regions). In alternative embodiments, for example, the orthogonal projection of the first transparent conductive pattern 61 on the second substrate 12 and the orthogonal projection of the second transparent conductive pattern 62 on the second substrate 12 at least partially overlap with each other. As such, since the first transparent conductive pattern 61 and the second transparent conductive pattern 62 are both formed to be interposed between the first substrate 11 and the second substrate 12, then the first transparent conductive pattern 61 and the second transparent conductive pattern 62 mate with each other in shape, i.e., they are in positive fit with each other, such that they cooperate with each other to implement an electromagnetic shielding effect so as to operate collectively to function as an electromagnetic shielding layer for completely shielding the electrical signals inside the display panel 1, avoiding electromagnetic interference.

Furthermore, as illustrated in FIG. 4, for example, in order to implement the touch control functionality of a touch screen, a plurality of first electrodes 51 which are for example spaced apart from one another and function as a plurality of first touch electrodes 51 are further provided on a side surface of the first substrate 11 facing towards the second substrate 12, and a plurality of second electrodes 52 which are for example spaced apart from one another and function as a plurality of second touch electrode 52 are provided on a side surface of the second substrate 12 facing towards the first substrate 11; in other words, in addition to the first transparent conductive pattern and the second transparent conductive pattern as above, the display panel according to the embodiments may for example be integrated with these touch electrodes therein, e.g., by directly arranging the plurality of first touch electrodes and the plurality of second touch electrodes between aforementioned two substrates provided opposite to each other, e.g., on a side surface of one of the two opposite substrates facing towards the other, facilitating further decreasing the thickness of the display device and decreasing the weight of the display panel.

In specific embodiments, by way of example, the first transparent conductive pattern 61 and the plurality of first touch electrodes 51 are provided in one and the same layer and are electrically isolated from each other, and are provided alternately (e.g., they are staggered relative to each other in every row and in every column), more specifically for example the first transparent conductive pattern fills the gaps among adjacent ones of the plurality of first touch electrodes 51, as illustrated in FIG. 2; as such, by arranging the first touch electrodes 51 and the first transparent conductive pattern 61 which functions as the electromagnetic shielding layer in one and the same layer and alternately, the overall thickness of the display panel 1 may be decreased thereby, without providing both the first transparent conductive pattern 61 and the first touch electrodes 51 in a layered structure; and in a condition that the first touch electrodes 51 are also prepared by a transparent conductive material (e.g., a material which is the same as the transparent conductive material for preparing the first transparent conductive pattern 61), by way of example, the first transparent conductive pattern 61 and the first touch electrodes 51 may be formed simultaneously by merely one patterning process, so as to save manufacturing time for the display panel 1 and decrease a production cost of the display panel 1. By way of example, as illustrated in FIG. 2, the plurality of first touch electrodes 51 and the first transparent conductive pattern 61 are electrically isolated from each other.

Moreover, for example, by way of example, the second transparent conductive pattern 62 and the plurality of second touch electrodes 52 are also provided in one and the same layer and are electrically isolated from each other, and are provided alternately (e.g., they are staggered relative to each other in every row and in every column), more specifically for example the second transparent conductive pattern fills the gaps among adjacent ones of the plurality of second touch electrodes 52, as illustrated in FIG. 3; as such, by arranging the second touch electrodes 52 and the second transparent conductive pattern 62 which functions as the electromagnetic shielding layer in one and the same layer and alternately, the overall thickness of the display panel 1 may be decreased thereby, without providing both the second transparent conductive pattern 62 and the second touch electrodes 52 in a layered structure; and in a condition that the second touch electrodes 52 are also prepared by a transparent conductive material (e.g., a material which is the same as the transparent conductive material for preparing the second transparent conductive pattern 62), by way of example, the second transparent conductive pattern 62 and the second touch electrodes 52 may be formed simultaneously by merely one patterning process, so as to save manufacturing time for the display panel 1 and decrease a production cost of the display panel 1. By way of example, as illustrated in FIG. 3, the plurality of second touch electrodes 52 and the second transparent conductive pattern 62 are electrically isolated from each other.

Furthermore, in order to implement the display control functionality of a touch screen, it is required that the display panel 1 for example comprises both first display electrode(s) and second display electrode(s), and the plurality of first electrodes 51 functioning as the plurality of first touch electrodes 51 as above may for example be multiplexed as a plurality of first display electrodes in a time division manner, and the plurality of second electrodes 52 functioning as the plurality of second touch electrodes 52 as above may also for example be multiplexed as a plurality of second display electrodes in a time division manner; as such, the structure of the display panel 1 may be simplified, and the thickness of the display panel may be decreased. In a condition that the plurality of first electrodes 51 functioning as the plurality of first touch electrodes may also be multiplexed as the plurality of first display electrodes and the plurality of second electrodes 52 functioning as the plurality of second touch electrodes may also be multiplexed as the plurality of second display electrodes, an operation time period of the display panel comprises a touch time period and a display time period. In the touch time period, the plurality of first touch electrodes and the plurality of second touch electrodes are configured to implement a touch detection functionality cooperatively; and in the display time period, the plurality of first touch electrodes and the plurality of second touch electrodes are configured to implement a display functionality cooperatively.

Specifically, in a condition that the plurality of first electrodes 51 are switched to operate as the plurality of first display electrodes in the display time period and the plurality of second electrodes are switched to operate as the plurality of second display electrodes in the display time period, the plurality of first display electrodes for example belong to one type of a common electrode and pixel electrodes, and the plurality of second display electrodes for example belong to the other type of the common electrode and the pixel electrodes. By way of example, during the display time period, as illustrated in FIG. 2, the plurality of first touch electrodes 51 may for example be a plurality of pixel electrodes, and as illustrated in FIG. 3, the plurality of second touch electrodes 52 may for example function collectively as the common electrode.

And, as illustrated in FIG. 2, the display panel 1 in specific embodiments may comprise the first substrate 11 and the second substrate 12, the first substrate 11 may for example be one of a color film substrate and an array substrate while the second substrate 12 may for example the other of the color film substrate and the array substrate. The plurality of first electrodes 51 are provided on a side surface of the first substrate 11 facing towards the second substrate 12, and the plurality of second electrodes 52 are provided on a side surface of the second substrate 12 facing towards the first substrate 11. And in a condition that the plurality of first electrodes 51 are switched to operate as the plurality of first touch electrodes in the touch time period and the plurality of second electrodes are switched to operate as the plurality of second touch electrodes in the touch time period, the plurality of first touch electrodes may for example belong to one type of driving electrodes and sensing electrodes, and the plurality of second touch electrodes may for example belong to the other type of the driving electrodes and the sensing electrodes. As such, the display panel is also integrated with the touch functionality. By way of example, during the touch time period, as illustrated in FIG. 2, the plurality of first touch electrodes 51 may for example be a plurality of touch sensing electrodes, each column of which is connected inside the display panel respectively; furthermore, columns of the plurality of touch sensing electrodes may also be connected to external touch sensing lead wires, respectively. And by way of example, during the touch time period, as illustrated in FIG. 3, the plurality of second touch electrodes 52 may for example be a plurality of touch driving electrodes, each row of which is connected (e.g., by bridges as illustrated) inside the display panel respectively; furthermore, rows of the plurality of touch sensing electrodes may also be connected to external touch driving/scanning lead wires, respectively.

As illustrated in FIG. 2 to FIG. 4, by way of example, the first transparent conductive pattern 61 is provided at positions of the gaps among the plurality of first touch electrodes 51 by filling therein in one and the same layer, and the first transparent conductive pattern 61 is set to be electrically connected to the ground point, so as to function to shield internal electrical signals inside the display panel; and the second transparent conductive pattern 62 is provided at positions of the gaps among the plurality of second touch electrodes 52 by filling therein in one and the same layer, and the second transparent conductive pattern 62 is set to be electrically connected to the ground point, so as to function to shield internal electrical signals inside the display panel.

As illustrated in FIG. 2 to FIG. 4, by way of example, the combination of both the orthogonal projection of the first transparent conductive pattern 61 on the second substrate 12 and the orthogonal projection of the second transparent conductive pattern 62 on the second substrate 12 may completely cover the display region of the second substrate 12, specifically for example as illustrated in FIG. 2, the first transparent conductive pattern 61 and the second transparent conductive pattern 62 are arranged to staggered relative to each other and their respective orthogonal projections on the second substrate 12 cooperate with each other (e.g., in a complementary arrangement in which they are in positive fit with each other without any overlapping therebetween, or in an arrangement in which they at least partially overlap with each other) so as to cover the display region of the whole second substrate 12. As such, the first transparent conductive pattern 61 and the second transparent conductive pattern 62 mate with each other so as to enable a sufficient shielding of internal electrical signals inside the display panel 1.

In embodiments of the disclosure, both electromagnetic shielding functionality and touch functionality are integrated inside the display panel, the overall performance of the display panel may be enhanced, so as to develop new technical developing direction for display components in industrial control and aviation fields.

In another aspect of embodiments of the disclosure, a display device is further provided, comprising the display panel 1 as above. The display device may for example be implemented as any product or component having a display functionality, such as television, monitor, digital photo frame, mobile phone, tablet computer and the like; and the display device may for example additionally comprise flexible printed circuit board(s), printed circuit board(s), and a backplate.

In embodiments of the disclosure, the display device may for example comprise a housing configured to accommodate the display panel 1.

Specifically, the display device may for example be a display screen used for aviation or a display screen used for industrial control. In a condition that the display device according to embodiments of the disclosure is applied to industrial control and aviation fields and the like, it may effectively shield internal electrical signals inside the display panel, without bonding the transparent conductive pattern and the display panel together by using the adhesive for full lamination, so as to enhance reliability of the display device and decrease the overall weight of the display device while improving electromagnetic compatibility.

As illustrated in FIG. 2, in specific embodiments, the display panel 1 of the display device comprises the first substrate 11 and the second substrate 12, the first substrate 11 may for example be one of a color film substrate and an array substrate while the second substrate 12 may for example the other of the color film substrate and the array substrate. The plurality of first electrodes 51 functioning as the plurality of first touch electrodes 51 are provided on a side of the first substrate 11 facing towards the second substrate 12, and the plurality of second electrodes 52 functioning as the plurality of second touch electrodes 52 are provided on a side of the second substrate 12 facing towards the first substrate 11. The plurality of first touch electrodes 51 may for example belong to one type of driving electrodes and sensing electrodes, and the plurality of second touch electrodes 52 may for example belong to the other type of the driving electrodes and the sensing electrodes. As such, the display panel is also integrated with the touch functionality.

As illustrated in FIG. 2 to FIG. 4, by way of example, the first transparent conductive pattern 61 is provided at positions of the gaps among the plurality of first touch electrodes 51 by filling therein in one and the same layer, for example, the first transparent conductive pattern 61 fills the positions of the gaps among adjacent one of the plurality of first touch electrodes 51; and the first transparent conductive pattern 61 is set to be electrically connected to the ground point, so as to function to shield internal electrical signals inside the display panel. And the second transparent conductive pattern 62 is provided at positions of the gaps among the plurality of second touch electrodes 52 by filling therein in one and the same layer, for example, the second transparent conductive pattern 62 fills the positions of the gaps among adjacent one of the plurality of second touch electrodes 52; and the second transparent conductive pattern 62 is set to be electrically connected to the ground point, so as to function to shield internal electrical signals inside the display panel 1.

As illustrated in FIG. 2 to FIG. 4, by way of example, the combination of both the orthogonal projection of the first transparent conductive pattern 61 on the second substrate 12 and the orthogonal projection of the second transparent conductive pattern 62 on the second substrate 12 may completely cover the display region of the second substrate 12, specifically for example as illustrated in FIG. 2, the first transparent conductive pattern 61 and the second transparent conductive pattern 62 are arranged to staggered relative to each other and their respective orthogonal projections on the second substrate 12 cooperate with each other (e.g., in a complementary arrangement in which they are in positive fit with each other without any overlapping therebetween, or in an arrangement in which they at least partially overlap with each other) so as to cover the display region of the whole second substrate 12. As such, the first transparent conductive pattern 61 and the second transparent conductive pattern 62 mate with each other so as to enable a sufficient shielding of internal electrical signals inside the display panel 1.

As compared with relevant art, embodiments of the disclosure have beneficial effects as below:

In above solutions, the first transparent conductive pattern is provided on a side of the first substrate of the display panel facing towards the second substrate, and is arranged to be electrically connected to a ground point, so as to enable a shielding of internal electrical signals inside the display panel; and/or the second transparent conductive pattern is provided on a side of the second substrate of the display panel facing towards the first substrate, and is arranged to be electrically connected to a ground point, so as to also enable a shielding of internal electrical signals inside the display panel. Since both the first transparent conductive pattern and/or the second transparent conductive pattern may be provided inside the display panel, then, it is not necessary to bond the transparent conductive pattern and the display panel together by using the adhesive for full lamination, and reliability of the display panel may be enhanced and the overall weight of the display panel may be decreased while improving electromagnetic compatibility thereof.

Unless otherwise defined, technical terms or scientific terms used in the present disclosure are intended to be understood in the ordinary meaning of the ordinary skill of the art. The words such as "first", "second" and the like used in the present disclosure do not denote any order, quantity, or importance, but are used to distinguish different components. The word "comprising", "comprise", "including", "include" or the like means that the element or item preceding the word comprises or includes the elements, items or equivalents thereof listed following the word, without excluding other elements or items. The word "connected", "connecting" or the like is not limited to physical or mechanical connection, but may include electrical connection, regardless of direct or indirect connection. The words "upper", "lower", "left", "right", and the like are only used to indicate the relative positional relationship, and the relative positional relationship may be change accordingly when an absolute position of the described object is changed.

It will be understood that, when an element such as a layer, a film, a region, or a substrate is referred to as being "on/above" or "under/below" another element, the element may be "directly on" or "directly under" the another element, or there may be intermediate elements therebetween.

The above are preferred embodiments of the embodiments of the present disclosure, and it should be noted that, as to those skilled in the art, they may make some improvements and refinements without departing from the principles of the embodiments of the present disclosure. These improvements and modifications should also be considered to be within a protection scope of embodiments of the present disclosure.

What is claimed is:

1. A display panel, comprising:
a first substrate, on a display side on the display panel; and
a second substrate opposite to the first substrate,
wherein a first transparent conductive pattern is provided on a side surface of the first substrate facing towards the second substrate, and is arranged to be electrically connected to a ground point;
wherein an orthogonal projection of the first transparent conductive pattern on the second substrate at least partially covers a display region of the second substrate, a second transparent conductive pattern is provided on a side surface of the second substrate facing towards the first substrate, and is arranged to be electrically connected to the ground point; and
wherein a plurality of first electrodes functioning as a plurality of first touch electrodes are provided on a side of the first substrate facing towards the second substrate, and a plurality of second electrodes functioning as a plurality of second touch electrodes are provided on a side of the second substrate facing towards the first substrate;
wherein the plurality of first electrodes is multiplexed as a plurality of first display electrodes in a time division manner, and the plurality of second touch electrodes are multiplexed as a plurality of second display electrodes in a time division manner; and
wherein an operation time period of the display panel comprises:
a touch time period, in which the plurality of first electrodes are switched to operate as the plurality of first touch electrodes and the plurality of second electrodes are switched to operate as the plurality of second touch electrodes; and
a display time period, in which the plurality of first electrodes are switched to operate as the plurality of first display electrodes and the plurality of second electrodes are switched to operate as the plurality of second display electrodes.

2. The display panel according to claim 1, wherein a combination of the orthogonal projection of the first transparent conductive pattern on the second substrate and an orthogonal projection of the second transparent conductive pattern on the second substrate completely covers the display region of the second substrate.

3. The display panel according to claim 2, wherein the orthogonal projection of the first transparent conductive pattern on the second substrate and the orthogonal projection of the second transparent conductive pattern on the second substrate are arranged to be staggered with each other.

4. The display panel according to claim 3, wherein the orthogonal projection of the first transparent conductive pattern on the second substrate and the orthogonal projection of the second transparent conductive pattern on the second substrate do not overlap with each other at all.

5. The display panel according to claim 3, wherein the orthogonal projection of the first transparent conductive pattern on the second substrate and the orthogonal projection of the second transparent conductive pattern on the second substrate at least partially overlap with each other.

6. The display panel according to claim 3, wherein the orthogonal projection of the first transparent conductive pattern on the second substrate comprises a plurality of first section blocks arranged in a form of a first array, and the orthogonal projection of the second transparent conductive pattern on the second substrate comprises a plurality of second section blocks arranged in a form of a second array which is complementary to the first array or at least partially overlaps with the first array, and the plurality of first section blocks and the plurality of second blocks are arranged alternately in every row and in every column.

7. The display panel according to claim 1, wherein the first transparent conductive pattern and the plurality of first electrodes are provided in one and the same layer and are electrically isolated from each other, and the first transparent conductive pattern are located at gaps among adjacent ones of the plurality of first electrodes.

8. The display panel according to claim 7, wherein the first transparent conductive pattern fills the gaps among adjacent ones of the plurality of first electrodes.

9. The display panel according to claim 1, wherein the second transparent conductive pattern and the plurality of second electrodes are provided in one and the same layer and are electrically isolated from each other, and the second transparent conductive pattern are located at gaps among adjacent ones of the plurality of second electrodes.

10. The display panel according to claim 9, wherein the second transparent conductive pattern fills the gaps among adjacent ones of the plurality of second electrodes.

11. The display panel according to claim 1, wherein in a condition that during the display time period, the plurality of first electrodes are switched to operate as the plurality of first display electrodes and the plurality of second electrodes are switched to operate as the plurality of second display electrodes, the plurality of first display electrodes belong to one type of a common electrode and pixel electrodes, and the plurality of second display electrodes belong to the other type of the common electrode and the pixel electrodes.

12. The display panel according to claim 1, wherein:
the display panel is a transmissive display panel, and the display side of the display panel is a light-emergent side for inner light rays; or
the display panel is a reflective display panel, and the display side of the display panel is a light-incident side for external light rays.

13. The display panel according to claim 1, wherein in a condition that during the touch time period, the plurality of first electrodes are switched to operate as the plurality of first touch electrodes and the plurality of second electrodes are switched to operate as the plurality of second touch electrodes, the plurality of first touch electrodes belong to one type of driving electrodes and sensing electrodes, and the plurality of second touch electrodes belong to the other type of the driving electrodes and the sensing electrodes.

14. A display device, comprising a display panel, the display panel comprising:
a first substrate, on a display side on the display panel; and
a second substrate opposite to the first substrate,
wherein a first transparent conductive pattern is provided on a side surface of the first substrate facing towards the second substrate, and is arranged to be electrically connected to a ground point;
wherein an orthogonal projection of the first transparent conductive pattern on the second substrate at least partially covers a display region of the second substrate, a second transparent conductive pattern is provided on a side surface of the second substrate facing towards the first substrate, and is arranged to be electrically connected to the ground point; and
wherein a plurality of first electrodes functioning as a plurality of first touch electrodes are provided on a side of the first substrate facing towards the second substrate, and a plurality of second electrodes functioning as a plurality of second touch electrodes are provided on a side of the second substrate facing towards the first substrate;
wherein a combination of the orthogonal projection of the first transparent conductive pattern on the second substrate and an orthogonal projection of the second transparent conductive pattern on the second substrate completely covers the display region of the second substrate;
wherein the orthogonal projection of the first transparent conductive pattern on the second substrate and the orthogonal projection of the second transparent conductive pattern on the second substrate are arranged to be staggered with each other; and
wherein the orthogonal projection of the first transparent conductive pattern on the second substrate comprises a plurality of first section blocks arranged in a form of a first array, and the orthogonal projection of the second transparent conductive pattern on the second substrate comprises a plurality of second section blocks arranged in a form of a second array which is complementary to the first array or at least partially overlaps with the first array, and the plurality of first section blocks and the plurality of second blocks are arranged alternately in every row and in every column.

15. The display device according to claim 14, wherein the display device is an aviation display screen or a display screen for industrial-control equipment.

16. The display device according to claim 14, wherein the display device further comprises a housing configured to accommodate the display panel.

17. The display device according to claim 14, wherein the plurality of first electrodes is multiplexed as a plurality of first display electrodes in a time division manner, and the plurality of second touch electrodes are multiplexed as a plurality of second display electrodes in a time division manner; and
an operation time period of the display panel comprises:
a touch time period, in which the plurality of first electrodes are switched to operate as the plurality of first touch electrodes and the plurality of second electrodes are switched to operate as the plurality of second touch electrodes; and
a display time period, in which the plurality of first electrodes are switched to operate as the plurality of first display electrodes and the plurality of second electrodes are switched to operate as the plurality of second display electrodes.

18. The display device according to claim 17, wherein in a condition that during the display time period, the plurality of first electrodes are switched to operate as the plurality of first display electrodes and the plurality of second electrodes are switched to operate as the plurality of second display electrodes, the plurality of first display electrodes belong to one type of a common electrode and pixel electrodes, and the plurality of second display electrodes belong to the other type of the common electrode and the pixel electrodes.

19. The display device according to claim 17, wherein in a condition that during the touch time period, the plurality of first electrodes are switched to operate as the plurality of first touch electrodes and the plurality of second electrodes are switched to operate as the plurality of second touch electrodes, the plurality of first touch electrodes belong to one type of driving electrodes and sensing electrodes, and the plurality of second touch electrodes belong to the other type of the driving electrodes and the sensing electrodes.

* * * * *